(12) United States Patent
Niijima

(10) Patent No.: US 6,297,938 B1
(45) Date of Patent: Oct. 2, 2001

(54) MAGNETIC HEAD AND METHOD FOR PRODUCING THE SAME

(75) Inventor: Masaaki Niijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/272,879

(22) Filed: Mar. 19, 1999

(30) Foreign Application Priority Data

Aug. 7, 1998 (JP) .................................................. 10-224854

(51) Int. Cl.[7] ....................................................... G11B 5/39
(52) U.S. Cl. ............................................................. 360/317
(58) Field of Search .................................. 360/119, 126, 360/313, 317, 318; 338/32 R; 324/252

(56) References Cited

U.S. PATENT DOCUMENTS 5,315,469 * 5/1994 McNeil ................................. 360/317
5,668,686 * 9/1997 Shouji et al. ......................... 360/317
5,894,388 * 4/1999 Sato et al. ............................ 360/317
6,025,977 * 2/2000 Hu et al. .............................. 360/317

FOREIGN PATENT DOCUMENTS 981919   3/1997 (JP) .

* cited by examiner

Primary Examiner—David L. Ometz
(74) Attorney, Agent, or Firm—Greer, Burns & Crain, Ltd.

(57) ABSTRACT

A magnetic head has a base, a magnetoresistive (MR) head section formed on the base and an inductive head section formed on the MR head section. The MR head section includes an MR element layer arranged above the base, and an operative layer involving a terminal layer and arranged above the base and laterally adjacent to the MR element layer. The major surface of the MR element layer is located in a level substantially identical to a major surface of the operative layer to form a generally even upper surface facing away from the base. Consequently, the inductive head section is provided with a generally flat recording gap layer.

8 Claims, 8 Drawing Sheets

MAGNETIC HEAD AND METHOD FOR PRODUCING THE SAME

BACKGROUND OF THE INVENTION

1. Field of the Invention

The present invention relates generally to a magnetic head and, more particularly, to an inductive/magnetoresistive (MR) composite head including a magnetoresistive (MR) head section laminated on a base. The present invention also relates to a method or process for producing the magnetic head.

2. Description of the Related Art

In conventional inductive/MR composite magnetic heads, it is known that an MR reading head section laminated on a base is frequently provided with an uneven end face facing away from the base, which is caused by a difference between the functionally required thickness of respective laminated layers of the MR head section. Such an uneven end face of the MR head section is apt to provide an uneven recording gap layer for an inductive recording head section formed above the MR head section in relation to the base. As a result, the linearity of the pattern of information written in a magnetic recording medium may be deteriorated, which can make it difficult to perform an optimum magnetic recording.

FIG. 10 shows in an enlarged schematic section an example of a laminated structure of a conventional inductive/MR composite magnetic head. The magnetic head includes a reading-side lower shield layer 102, a reading-side lower insulating layer 103, a magnetoresistive (MR) element layer 104, a hard magnetic element layer 105, a terminal layer 106, a reading-side upper insulating layer 107, a reading-side upper shield layer 108 also serving as a recording-side lower pole, a recording gap layer 109, a recording-side upper pole 110 and a protective layer 111, which are formed or laminated in this order on a base 101 by using a thin-film technique for producing semiconductors. In this arrangement, the MR element layer 104 has a thickness generally less than the total thickness of the adjacent hard magnetic element layer 105 plus terminal layer 106 as illustrated. Consequently, the upper end face of the reading head section, i.e., the upper surface of the reading-side upper shield layer 108, is unevenly formed, and thereby the evenness of the recording gap layer 109 of a recording head section is lost.

The thickness of each layer of the composite magnetic head is determined to be in a certain range functionally required for the respective layer. For example, the thickness of the MR element layer 104 is determined in a range required for obtaining a desired is magnetoresistive effect, the thickness of the hard magnetic element layer 105 is determined in a range required for obtaining a desired magnetic domain adjusting function for the MR element layer 104, and the thickness of the terminal layer 106 is determined in a range required for obtaining a desired current supply and signal transmission function for the MR element layer 104. Therefore, it is not preferred, in consideration of the performance of the magnetic head, to simply equalize the thickness of the MR element layer 104 with the total thickness of the hard magnetic element layer 105 plus terminal layer 106, in order to flatten the recording gap layer 109. In this situation, it is required to even the upper end face of the reading head section without changing the respective thickness of the MR element layer 104, the hard magnetic element layer 105 and the terminal layer 106 and, thereby, to flatten the recording gap layer 109.

Japanese Unexamined Patent Publication (Kokai) No. 9-81919 (JP-A-9-81919) discloses a method for producing a thin-film magnetic head which can even a recording gap layer without changing the respective thickness of an MR element layer, a hard magnetic element layer and a terminal layer. According to this method, after the MR element layer is formed and before the hard magnetic element layer is laminated, a thin film layer, of which a thickness corresponds to the difference between the thickness of the MR element layer and the total thickness of the hard magnetic element layer plus terminal layer, is laminated on the MR element layer. After that, the hard magnetic element layer and the terminal layer are laminated adjacent to the MR element layer and the thin film layer, so that the upper surface of the thin film layer and the upper surface of the terminal layer are located generally in an identical plane or level. Consequently, the recording gap layer formed above the thin film layer is substantially flattened.

In this prior-art method, it is possible to flatten the recording gap layer, but it is necessary to perform an additional step for forming the thin film layer on the MR element layer in the laminating process of the magnetic head. The introduction of the additional step may increase the production time and cost of the magnetic head. Also, the thin film layer formed on the MR element layer increases a reading gap dimension, i.e., the distance between the reading-side lower and upper shield layers arranged at respective sides of the MR element layer. The reading gap dimension normally affects directly the reading signal characteristic of the magnetic head. Therefore, the above method may deteriorate the reading signal characteristic.

Instead of the above method, it may be possible to even the upper surface of the reading-side upper insulating layer or of the reading-side upper shielding layer by a mechanical or chemical process for removing a material during the laminating process. However, this material removing process is also an additional step introduced into the laminating process, and thus may increase the production time and cost of the magnetic head. In particular, when the upper surface of the reading-side upper insulating layer is flattened by the material removing process, it is preferred to previously increase the thickness of the reading-side upper insulating layer so as to prevent the step coverage function thereof at a stepped portion formed between the MR element layer and the terminal layer from being deteriorated. As a result, the reading gap dimension is increased in the same manner as the above method, and thus the reading signal characteristic may be deteriorated.

SUMMARY OF THE INVENTION

It is therefore an object of the present invention to provide a magnetic head which can solve the above-mentioned problems.

It is another object of the present invention to provide a magnetic head including an MR reading head section laminated on a base, and also provided with a substantially flattened recording gap layer in an inductive recording head section, which does not deteriorate a reading signal characteristic, and thus can perform an optimum magnetic recording/reading.

It is further object of the present invention to provide a method for producing a magnetic disk, which can substantially flatten a recording gap layer in an inductive recording head without increasing the number of steps in a laminating process, and thus can prevent a production cost from being increased.

It is yet further object of the present invention to provide a disk drive incorporating therein an improved magnetic head, which can perform high performance magnetic recording/reading.

In accordance with the present invention, there is provided a magnetic head comprising a base, a magnetoresistive head section formed on the base, and an inductive head section formed on the magnetoresistive head section, wherein the magnetoresistive head section includes a magnetoresistive element layer arranged above the base, and an operative layer involving a terminal layer, the operative layer arranged above the base and laterally adjacent to the magnetoresistive element layer, wherein a major surface of the magnetoresistive element layer is located in a level substantially identical to a major surface of the operative layer to form a generally even upper surface facing away from the base, and wherein the inductive head section includes a generally flat recording gap layer.

In a preferred aspect of the invention, the magnetic head further comprises a lower film member arranged between the base and the magnetoresistive element layer as well as the operative layer, wherein a surface, facing away from the base, of the lower film member includes a first area being in contact with the magnetoresistive element layer and a second area being in contact with the operative layer, and wherein the second area is positioned at a lower level than the first area in relation to the base.

The lower film member may be formed from a first portion defining the first area and a second portion defining the second area, the second portion having a thickness less than that of the first portion.

In this arrangement, it is preferred that the lower film member includes a first lower layer arranged above the base and having a generally uniform thickness as a whole, and a second lower layer arranged above the first lower layer and having a locally varied thickness.

Alternatively, it is also preferred that the lower film member includes a first lower layer arranged above the base and having a locally varied thickness, and a second lower layer arranged above the first lower layer and having a generally uniform thickness as a whole.

The operative layer may further involve a hard magnetic element layer.

The magnetic head may further comprises an upper film member arranged between the magnetoresistive element layer as well as the operative layer and the recording gap layer, and having a generally uniform thickness as a whole.

The present invention also provides a method for producing a magnetic head provided with a magnetoresistive head section formed on a base, comprising the steps of forming a lower film member above the base, the lower film member including first and second areas of a surface thereof, facing away from the base, the second area being positioned at a lower level than the first area in relation to the base; forming a magnetoresistive element layer on the first area of the lower film member; and forming an operative layer involving a terminal layer on the second area of the lower film member and laterally adjacent to the magnetoresistive element layer, to locate a major surface of the magnetoresistive element layer in a level substantially identical to a major surface of the operative layer.

In a preferred aspect of the invention, the lower film member forming step includes a first step of forming a lower film blank having a generally uniform thickness as a whole and a second step of removing a certain portion of the formed lower film blank to provide the first and second areas of the lower film member.

In this arrangement, it is preferred that the magnetoresistive element layer forming step includes a step of forming a magnetoresistive element blank having a generally uniform thickness as a whole, performed between the first and second steps, and a step of removing a certain portion of the formed magnetoresistive element blank, performed generally simultaneously with the second step.

Alternatively, it is also preferred that the magnetoresistive element layer forming step includes a step of forming a magnetoresistive element blank having a generally uniform thickness as a whole, performed after the second step, and a step of removing a certain portion of the formed magnetoresistive element blank.

The present invention further provides that a disk drive comprising a magnetic head, and an actuator for shifting the magnetic head on a disk medium, wherein the magnetic head includes a magnetoresistive head section formed on a base, and an inductive head section formed on the magnetoresistive head section, wherein the magnetoresistive head section is provided with a magnetoresistive element layer arranged above the base, and an operative layer involving a terminal layer and arranged above the base and laterally adjacent to the magnetoresistive element layer, a major surface of the magnetoresistive element layer being located in a level substantially identical to a major surface of the operative layer to form a generally even upper surface facing away from the base, and wherein the inductive head section is provided with a generally flat recording gap layer.

BRIEF DESCRIPTION OF THE DRAWINGS

The above and other objects, features, and advantages of the present invention will become more apparent from the following description of preferred embodiments in connection with the accompanying drawings, in which.

DESCRIPTION OF THE PREFERRED EMBODIMENT

Figure 1:
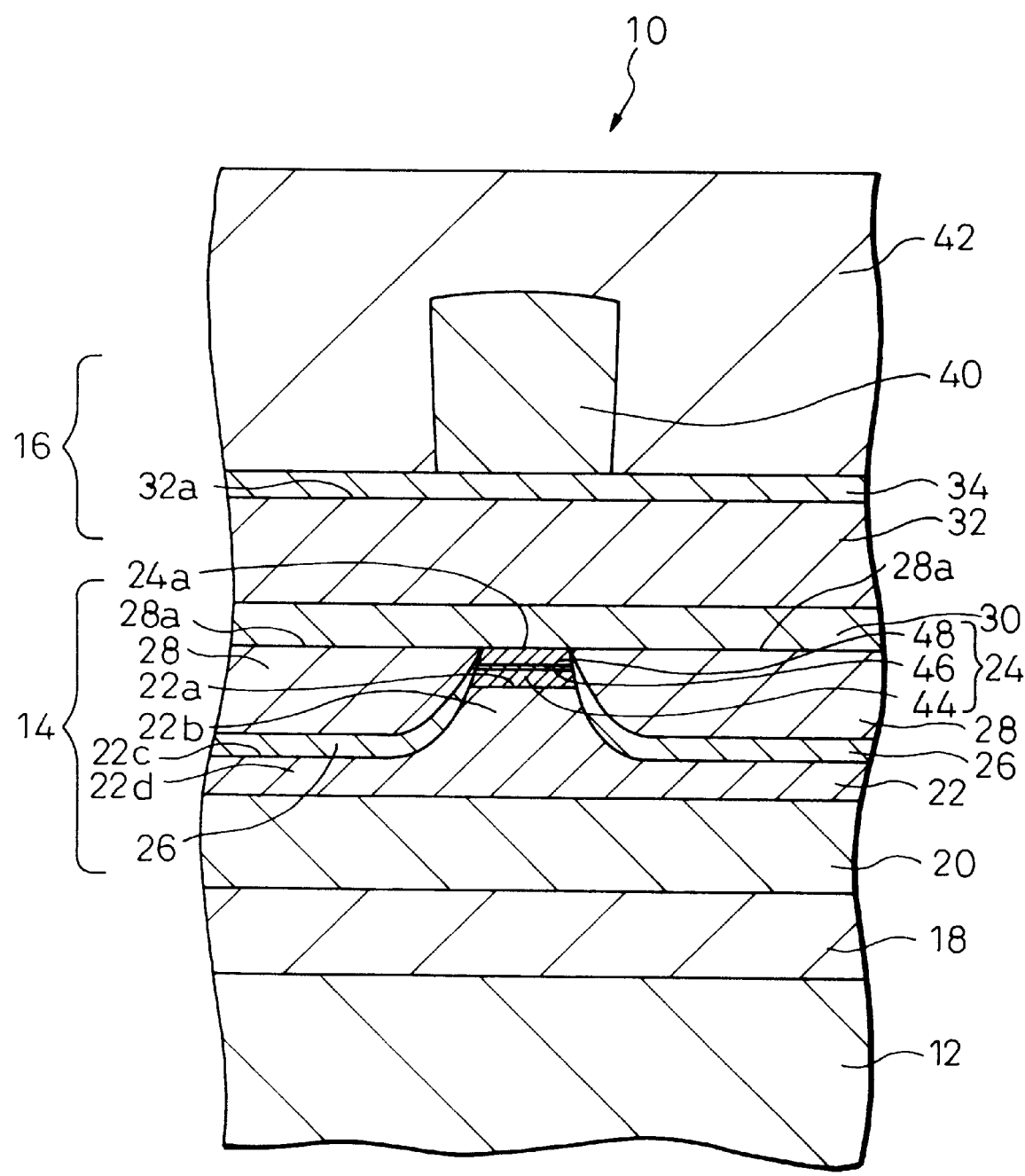
FIG. 1 is an enlarged sectional view of a part of a magnetic head according to one embodiment of the present invention.
Figure 2:
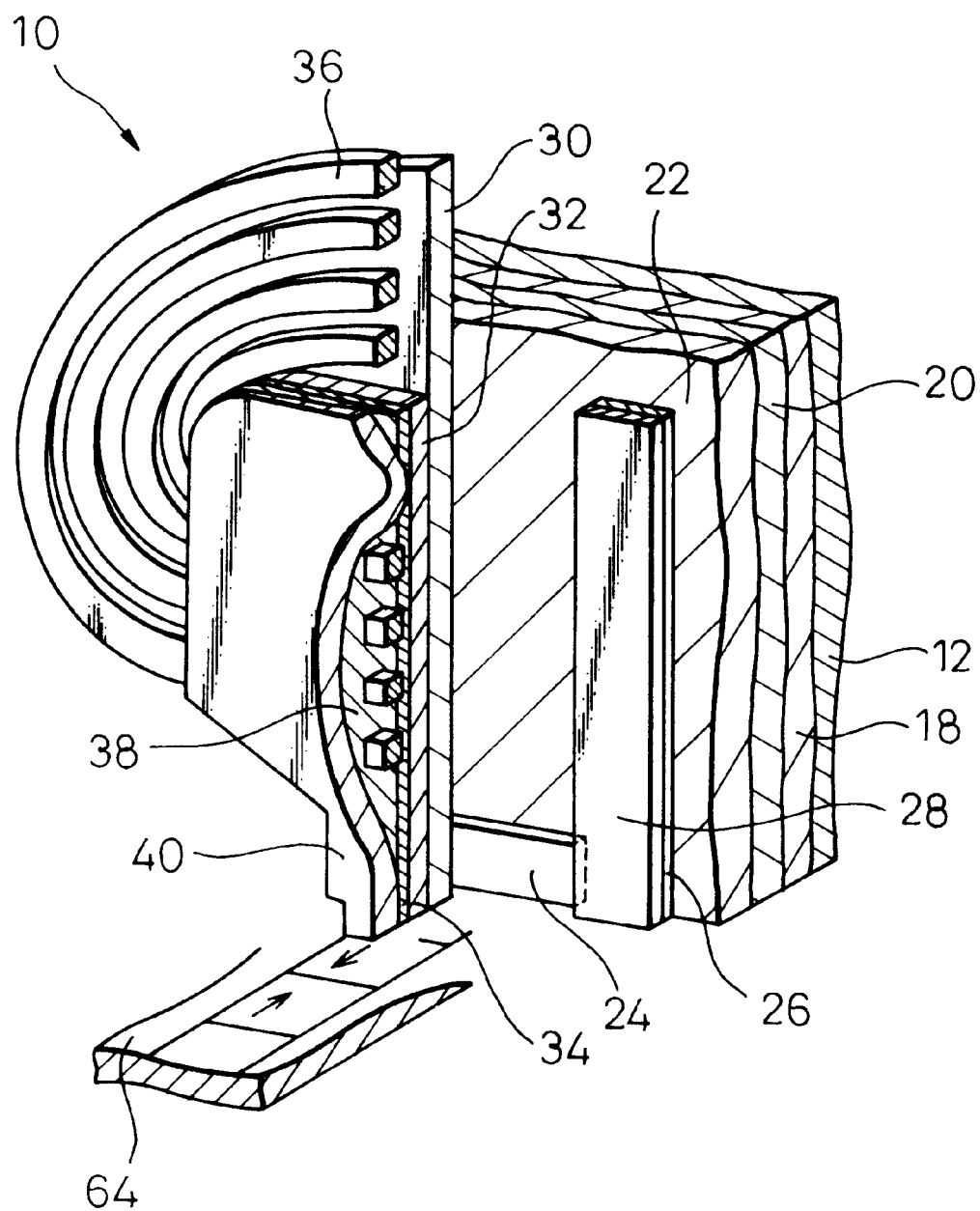
FIG. 2 is a partially cutout exploded perspective view of the magnetic head of FIG. 1.

Referring now to the drawings, in which the same or similar components are denoted by the same reference numerals, FIGS. 1 and 2 diagrammatically show an inductive/MR composite magnetic head 10 according to one embodiment of the present invention. The magnetic head 10 includes a base 12, a magnetoresistive (MR) reading head section 14, and an inductive recording head section 16, both head sections 14, 16 being formed and laminated on the base 12 by a laminating process mentioned later. In the illustrated embodiment, a base protection layer 18 made of, e.g., $Al_2O_3$ is laminated on the surface of the base 12 to cover the surface.

The MR head section 14 includes a reading-side lower shield layer 20 (made of, e.g., NiFe) laminated on the base protection layer 18, a reading-side lower insulating layer 22 (made of, e.g., $Al_2O_3$) laminated on the lower shield layer 20, a magnetoresistive (MR) element layer 24 locally laminated on the lower insulating layer 22, a pair of hard magnetic element layers 26 (made of, e.g., CoCrPt) laminated on the lower insulating layer 22 and located adjacent to the MR element layer 24, a pair of terminal layers 28 (made of, e.g., Ta and so forth) laminated respectively on the hard magnetic element layers 26 and located adjacent to the MR element layer 24, a reading-side upper insulating layer 30 (made of, e.g., $Al_2O_3$) laminated on the MR element layer 24 and the terminal layers 28, and a reading-side upper shield layer 32 (made of, e.g., NiFe) laminated on the upper insulating layer 30.

The base protection layer 18, the reading-side lower shield layer 20 and the reading-side lower insulating layer 22 cooperate to constitute a lower film member positioned between the base 12 and the MR element layer 24 as well as the hard magnetic element layer 26. In particular, the lower shield layer 20 is a first lower layer acting as a magnetic shield, and the lower insulating layer 22 is a second lower layer acting as a non-magnetic insulation. Also, the upper shield layer 32 acts as a magnetic shield, and the upper insulating layer 30 acts as a non-magnetic insulation. Further the hard magnetic element layers 26 and the terminal layers 28 constitute an operative layer arranged above the base 12 and laterally adjacent to the MR element layer 24.

The inductive recording head section 16 includes a recording-side lower pole 32 also serving as the reading-side upper shield layer 32, a recording gap layer 34 (made of, e.g., $Al_2O_3$) laminated on the lower pole 32, a coil 36 formed on the recording gap layer 34, a recording-side insulating layer 38 laminated on the recording gap layer 34 to enclose the coil 36, and a recording-side upper pole 40 (made of, e.g., NiFe) laminated on the recording gap layer 34 and the insulating layer 38. Further, a protective layer 42 (made of, e.g., $Al_2O_3$) is formed to cover the recording gap layer 34 and the upper pole 40. Each of the above-mentioned layers constituting the magnetic head is formed with a generally uniform thickness, except for the reading-side lower insulating layer 22, the recording-side insulating layer 38 and the protective layer 42.

In the magnetic head 10, the MR element layer 24 has a triplex structure which includes a bias layer 44 (made of, e.g., NiFeCr) laminated on the lower insulating layer 22, an intermediate layer 46 (made of, e.g., Ta) laminated on the bias layer 44, and a magnetoresistive effect layer 48 (made of, e.g., NiFe) laminated on the intermediate layer 46. The MR element layer 24 has an entire thickness thereof less than the total thickness of the adjacent hard magnetic element layer 26 plus terminal layer 28. In this arrangement, the MR element layer 24 with such a triplex structure has the entire thickness (e.g., 300 Å) required for obtaining a desired magnetoresistive effect. Also, each hard magnetic element layer 26 has a thickness (e.g., 300 Å) required for obtaining a desired magnetic domain adjusting function for the MR element layer 24, and each terminal layer 28 has a thickness (e.g., 700 Å) required for obtaining a desired current supply and signal transmission function for the MR element layer 24.

In the magnetic head 10, the upper major surface 24a of the MR element layer 24 and the upper major surface 28a of each terminal layer 28, both facing away from the base 12, are located in a substantially identical plane or level, without changing the functionally required thickness of each of the MR element layer 24, the hard magnetic element layer 26 and the terminal layer 28. As a result, the upper end face of the reading head section 14, that is, the upper surface 32a of the reading-side upper shield layer 32, facing away from the base 12, is generally flattened. Consequently, the recording head section 16 is provided with a substantially flat recording gap layer 34, and thus can perform an optimum magnetic recording.

In order to locate the upper surface 24a of the MR element layer 24 and the upper surface 28a of each terminal layer 28 in substantially the identical level, the reading-side lower insulating layer 22, as the second lower layer of the lower film member in the magnetic head 10, is provided with a local change of thickness in itself, as illustrated. More particularly, the lower insulating layer 22 is integrally formed from a thicker part 22b defining an upper surface 22a contacting the MR element layer 24, and a thinner part 22d defining an upper surface 22c contacting the hard magnetic element layers 26, the thinner part 22d having a thickness less than that of the thicker part 22b.

The thicker part 22b of the lower insulating layer 22 cooperates with one part, located under the thicker part 22b, of the lower shield layer 20 with a generally uniform thickness, to constitute a thicker first portion (approximately 1000 Å thickness) of the lower film member, which defines a first area of surface (or the upper surface 22a) on which the MR element layer 24 is laminated. The thinner part 22d of the lower insulating layer 22 cooperates with another part, located under the thinner part 22d, of the lower shield layer 20 with a generally uniform thickness, to constitute a thinner second portion (approximately 300 Å thickness) of the lower film member, which defines a second area of surface (or the upper surface 22c) on which the hard magnetic element layers 26 are laminated. Consequently, the second surface area (or the upper surface 22c) on which the hard magnetic element layers 26 are laminated is positioned at a lower level than the first surface area (or the upper surface 22a) on which the MR element layer 24 is laminated, in relation to the base 12, due to the difference between the respective thickness of the first and second portions of the lower film member, that is, the difference between the respective thickness of the thicker and thinner parts 22b, 22d of the lower insulating layer 22.

The difference between the respective thickness of the first and second portions of the lower film member, or of the thicker and thinner parts 22b, 22d of the lower insulating layer 22, substantially corresponds to the difference between the entire thickness of the MR element layer 24 and the total thickness of each hard magnetic element layer 26 plus each terminal layer 28. In this manner, the upper surface 24a of the MR element layer 24 and the upper surface 28a of each terminal layer 28 are located at a generally identical distance from the base 12, i.e., are placed at a substantially identical level.

The laminating order of each hard magnetic element layer 26 and the corresponding terminal layer 28 can be reversed, i.e., the hard magnetic element layer 26 can laminated on the terminal layer 28 which is in turn laminated on the lower insulating layer 22. In this case, the upper surface 24a of the MR element layer 24 and the upper surface of each hard magnetic element layer 26 are located in a substantially identical level. This arrangement also serves to substantially flatten the recording gap layer 34 of the recording head section 16.

The above-mentioned laminated structure of the magnetic head 10 is formed through a thin-film producing semiconductor process. Therefore, it is not easy to locate the upper surface 24a of the MR element layer 24 and the upper surface 28a of each terminal layer 28 in a fully identical level. In the present invention, a condition wherein the recording gap layer 34 is substantially flattened to such an extent as not to affect the recording signal characteristic of the recording head section 16 can be allowed. From this viewpoint, the magnetic head 10 permits a slight difference in height, e.g., at most 100 Å, between the upper surface 24a of the MR element layer 24 and the upper surface 28a of each terminal layer 28.

A method or process for producing the magnetic head 10 having the above structure is described below with reference to FIGS. 1 and 3 to 6.

Figure 3:
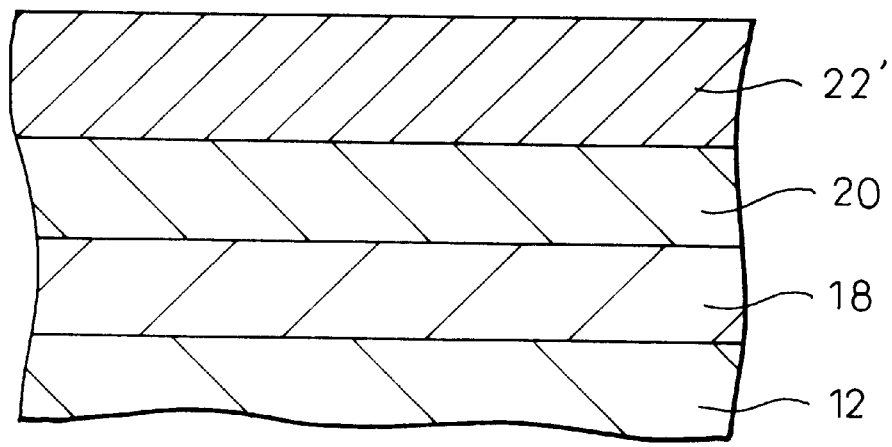
FIG. 3 is an enlarged sectional view showing one step of a process for producing the magnetic head of FIG. 1.
Figure 4:
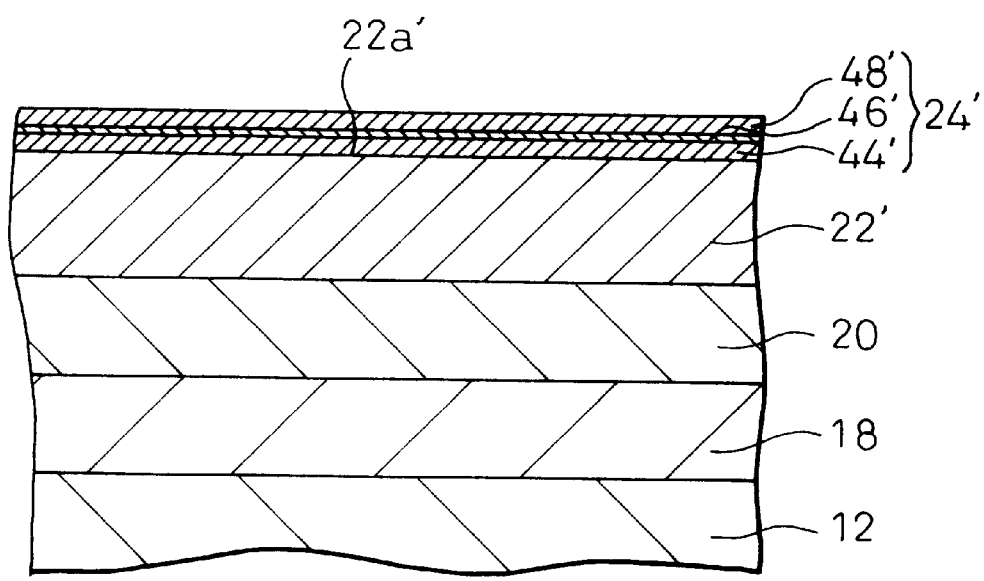
FIG. 4 is an enlarged sectional view showing the next step of the process for producing the magnetic head of FIG. 1.

On the surface of the base 12 formed from a generally disk-shaped wafer, the base protection layer 18, the reading-side lower shield layer 20 and the reading-side lower insulating layer 22' are laminated in this order and formed respectively with a uniform thickness in a range from several hundreds of Å to several $\mu$m (FIG. 3). In this stage, the lower shield layer 20 and the lower insulating layer 22' are formed as a lower film blank having a generally uniform thickness as a whole. Then, on the upper surface 22a' of the lower insulating layer 22', the bias layer 44', the intermediate layer 46' and the magnetoresistive effect layer 48' are laminated in this order and formed respectively with a uniform thickness in a range from several tens of Å to several hundreds of Å, to form the MR element layer 24' with a triplex structure (FIG. 4). In this stage, the MR element layer 24' is formed as an MR element blank having a generally uniform thickness as a whole.

Figure 5:
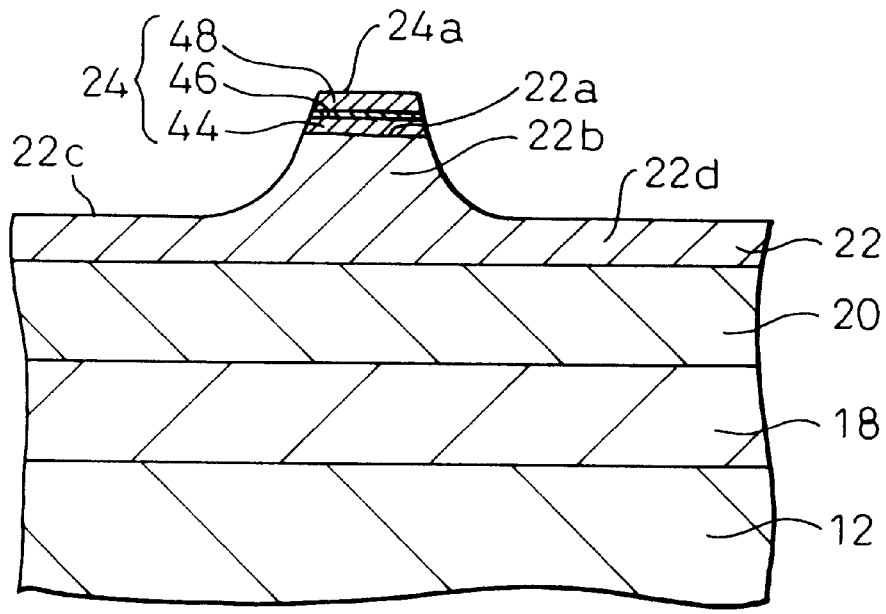
FIG. 5 is an enlarged sectional view showing the further step of the process for producing the magnetic head of FIG. 1.

Then, a resist mask (not shown) is provided at a desired position in the upper surface of the MR element blank, and the MR element blank is thereafter trimmed into a predetermined profile through, e.g., an etching process such as an ion milling process, so as to pattern the MR element layer 24 (FIG. 5). Simultaneously, a certain portion of the lower film blank, which is positioned outside of the MR element layer 24, is partially removed by, e.g., adjusting the operation time of the ion milling process. In this manner, the lower insulating layer 22 including the thicker part 22b and the thinner part 22d respectively corresponding to the first and second portions of the lower film member (FIG. 5) is formed.

Figure 6:
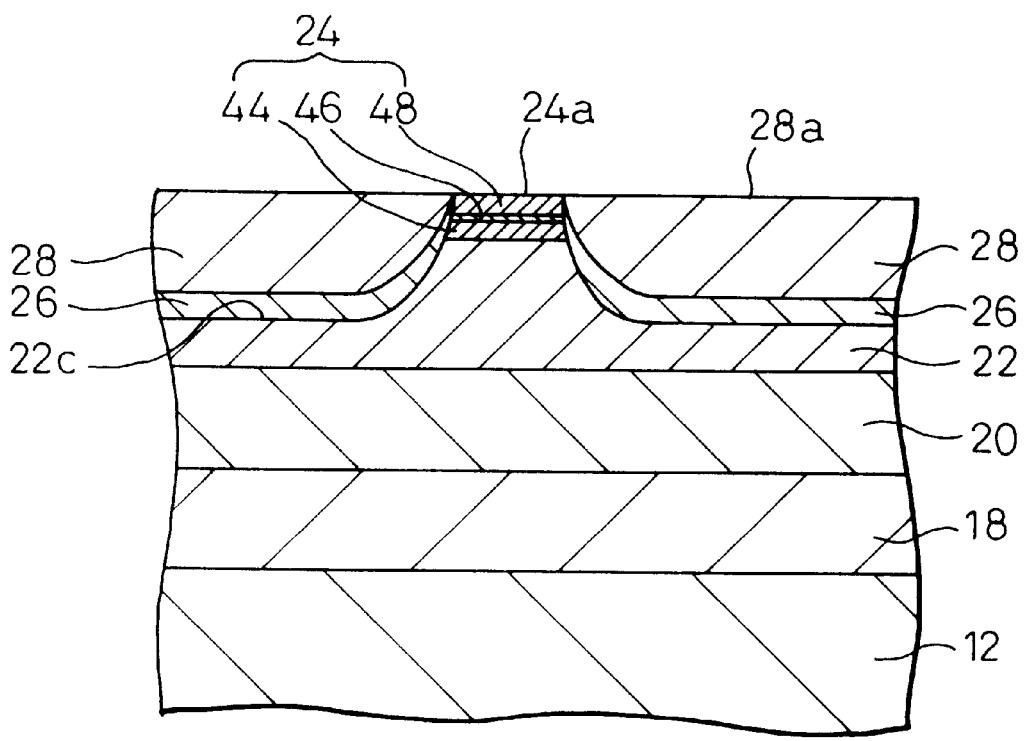
FIG. 6 is an enlarged sectional view showing the yet further step of the process for producing the magnetic head of FIG. 1.

After that, the pair of hard magnetic element layers 26 are formed on the upper surface 22c of the lower insulating layer 22, and the pair of terminal layers 28 are formed on the respective upper surfaces of the hard magnetic element layers 26, through a similar resist process and a similar etching process (FIG. 6). It is important to form both the hard magnetic element layers 26 and the terminal layers 28 in such a manner as to contact respectively with opposed edges of the MR element layer 24. When the etching process for forming the terminal layers 28 is finished, the upper surface 24a of the MR element layer 24 and the upper surface 28a of each terminal layer 28 are located in a substantially identical level, as illustrated.

On the substantially flattened surface including the upper surface 24a of the MR element layer 24 and the upper surface 28a of each terminal layer 28, the reading-side upper insulating layer 30, the reading-side upper shield layer (also serving as the recording-side lower pole) 32 and the recording gap layer 34 are laminated in this order and formed respectively with a uniform thickness in a range from several hundreds of Å to several $\mu$m. Then, the coil 36 and the recording-side insulating layer 38 are formed and laminated on the recording gap layer 34, and the recording-side upper pole 40 is formed and laminated with a uniform thickness of several $\mu$m on the recording gap layer 34 and the recording-side insulating layer 38. Further, the protective layer 42 is formed and laminated to cover the recording gap layer 34 and the recording-side upper pole 40. In this manner, the magnetic head 10 provided with the substantially flattened recording gap layer 34 is structured (FIG. 1).

In the magnetic head 10 having the above stricture, since the portion of the reading-side lower insulating layer 22', which is located under the MR element blank 24', is partially removed in order to substantially flatten the recording gap layer 34, it is preferred that the lower insulating layer 22', which has not yet been partially removed, has a somewhat larger thickness than the reading-side lower insulating layer of the conventional structure. However, in comparison with the other solution in which the recording-side upper insulating layer is partially removed, it is possible to reduce the thickness of the thinner part 22d of the reading-side lower insulating layer 22 to the minimum in a necessary range without deteriorating the step coverage function thereof and it is also possible to prevent the whole thickness of the lower insulating layer 22 from being increased, since the substantially flat lower insulating layer 22' formed on the reading-side lower shield layer 20 is partially removed. Also, it is possible to reduce the thickness of the reading-side upper insulating layer 30 to the minimum in a necessary range without considering the step coverage function thereof, since the upper insulating layer 30 can be formed on the substantially flattened surface including the upper surface 24a of the MR element layer 24 and the upper surface 28a of each terminal layer 28. In this manner, it is possible to prevent the distance between the reading-side lower shield layer 20 and the reading-side upper shield layer 32 (that is, the reading gap dimension), between which the MR element layer 24 is located, from being increased, and thereby the recording gap layer 34 can be substantially flattened without affecting the reading signal characteristic of the magnetic head 10.

Also, in the magnetic head 10 having the above structure, since the step of partially removing the reading-side lower insulating layer 22' for substantially flattening the recording gap layer 34 is performed simultaneously or combined with the etching process for the MR element layer 24 which is essentially performed in the thin-film forming process of the magnetic head 10, it is not necessary to perform any additional steps. Therefore, it is possible to prevent the production time and cost of the magnetic head 10 from being increased.

Figure 7:
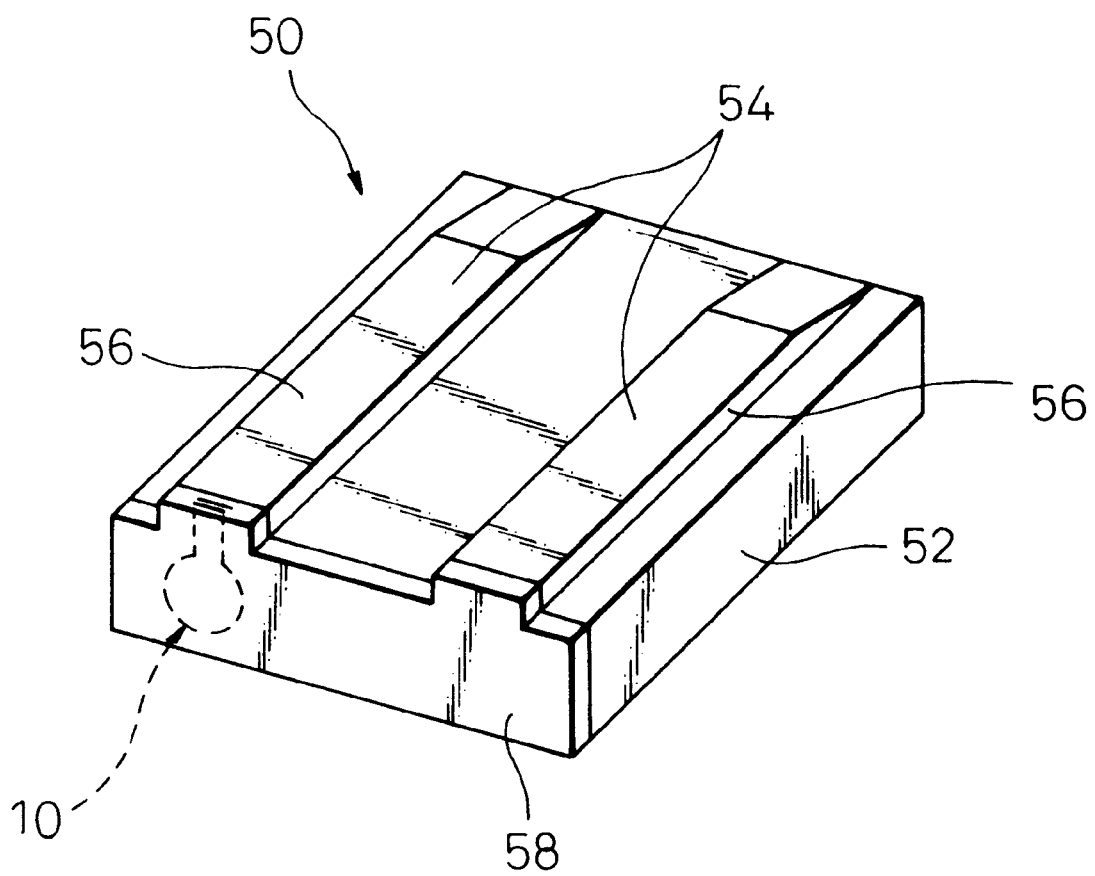
FIG. 7 is a perspective view of a magnetic head slider into which the magnetic head of FIG. 1 is incorporated.

FIG. 7 shows an example of a magnetic head slider 50 provided with the magnetic head 10. The magnetic head slider 50 includes a slider body 52 with a generally rectangular shape, and a pair of rails 56 provided respectively with air bearing surfaces 54 for generating a flying force. The slider body 52 is provided at an air discharging end thereof and adjacent to one rail 56 with a thin-film head section 58 in which the magnetic head 10 is incorporated. In this case, the slider body 52 constitutes the base 12 of the magnetic head 10.

Figure 8:
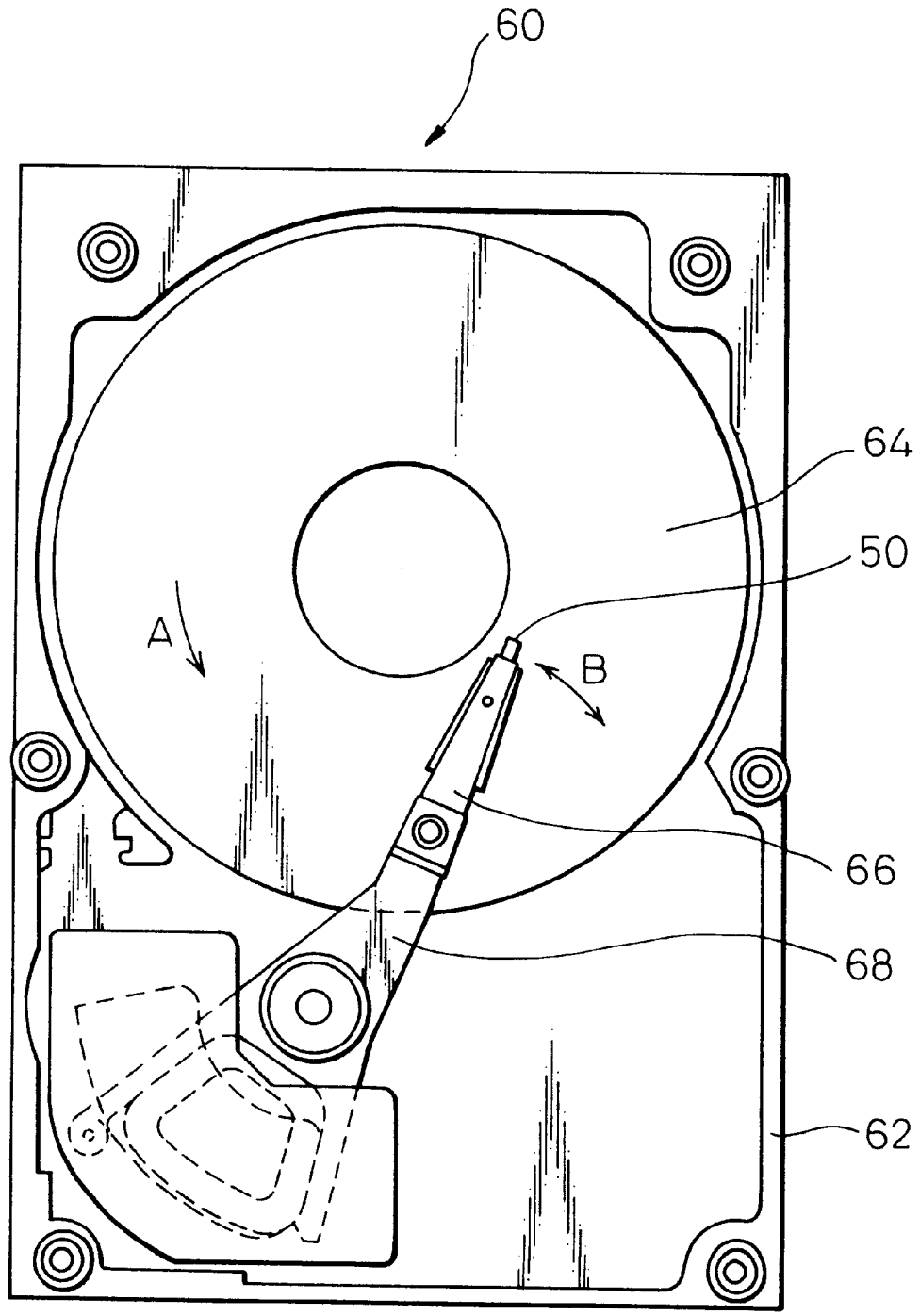
FIG. 8 is a plan view of a magnetic disk drive, according to one embodiment of the present invention, into which the magnetic head slider of FIG. 7 is incorporated.

FIG. 8 shows an internal structure of a magnetic disk drive 60 according to one embodiment of the present invention, in which the magnetic head slider 50 is incorporated. The magnetic disk drive 60 includes a base 62 forming a part of a housing, a magnetic disk 64 capable of rotating at high speed on the base 62 in a direction shown by an arrow A, and an arm 68 for carrying the magnetic head slider 50 on the distal end of a suspension 66 and capable of shifting on the base 62 in a direction shown by an arrow B. The magnetic head slider 50 scans, in a radial direction, the surface of the magnetic disk 64 rotating at high speed while flying thereon in a normal operation, and therewith the magnetic head 10 records or reads information on the magnetic disk 64.

Figure 9:
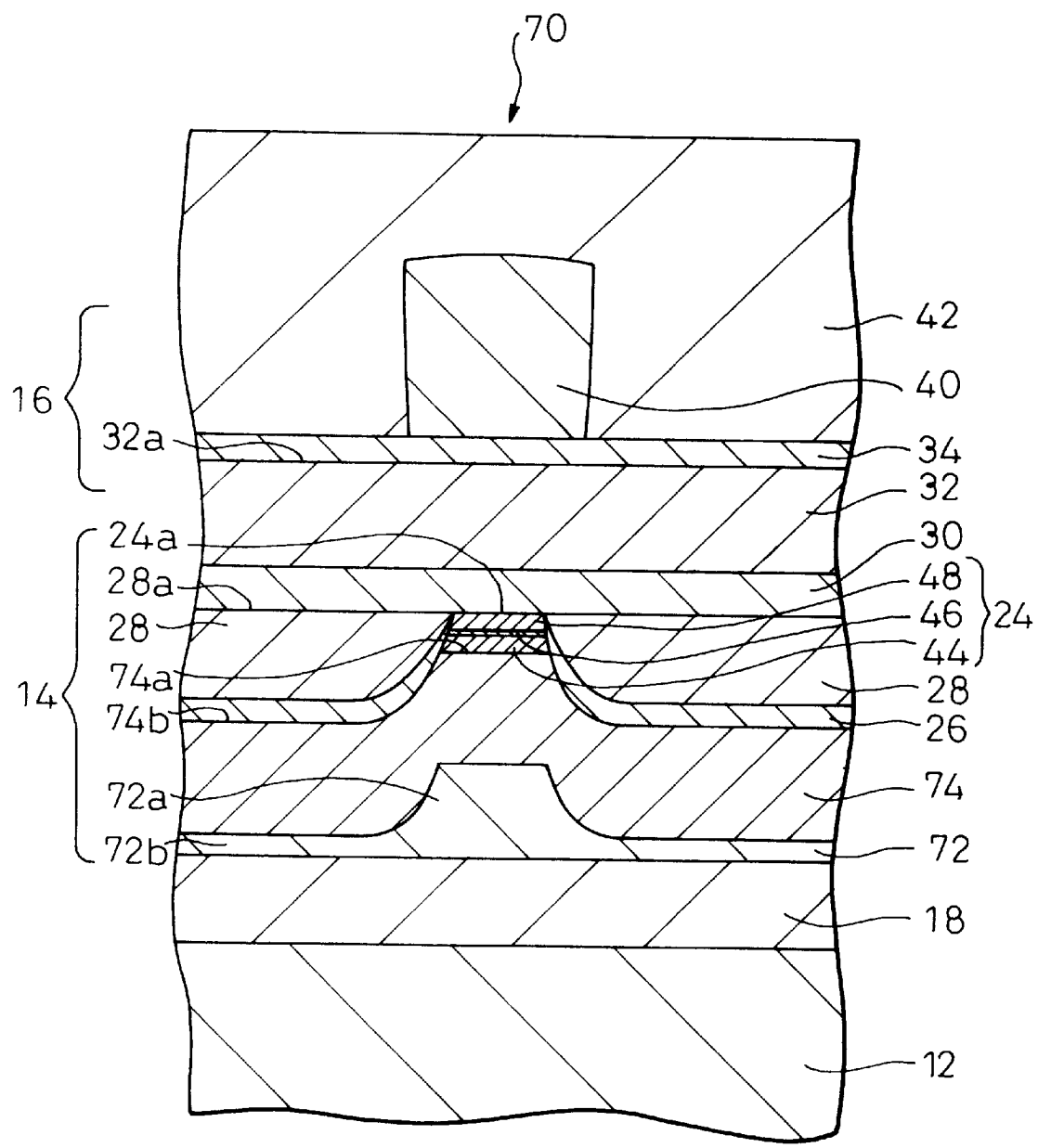
FIG. 9 is an enlarged sectional view of a part of a magnetic head according to another embodiment of the present invention.
Figure 10:
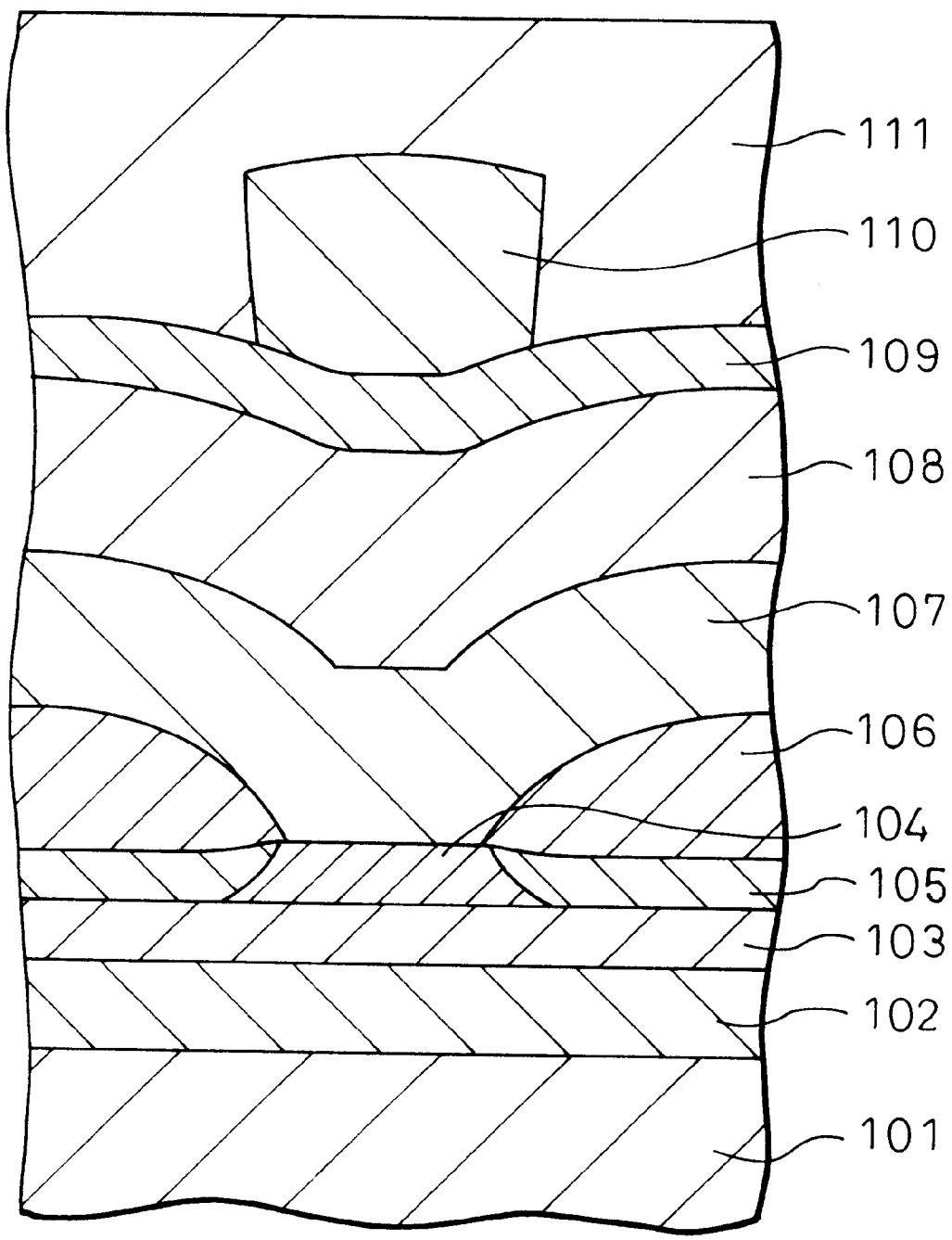
FIG. 10 is an enlarged sectional view of a part of a conventional magnetic head.

FIG. 9 diagrammatically shows a magnetic head 70 according to another embodiment of the present invention. The magnetic head 70 is provided with a laminated structure generally similar to that of the magnetic head 10 shown in FIG. 1, except for means to substantially flatten the recording gap layer 34 of the inductive recording head section 16. The components of the magnetic head 70 same as, or similar, to those of the magnetic head 10 are denoted by the same reference numerals, and the detailed description thereof is not repeated.

In the magnetic head 70, a reading-side lower shield layer 72, which is a first lower layer of a lower film member arranged between the base 12 and the MR element layer 24 as well as the hard magnetic element layer 26, is provided with a local change of thickness in itself, as illustrated. More particularly, the lower shield layer 72 is integrally formed from a thicker part 72a located below or at a position corresponding to the MR element layer 24, and a thinner part 72b located below or at a position corresponding to the hard magnetic element layers 26, the thinner part 72b having a thickness less than that of the thicker part 72a.

The thicker part 72a of the lower shield layer 72 cooperates with one part, located over the thicker part 72a, of a reading-side lower insulating layer 74 with a generally uniform thickness, to constitute a thicker first portion of the lower film member, which defines a first area of surface (or the upper surface 74a of the lower insulating layer 74) on which the MR element layer 24 is laminated. The thinner part 72b of the lower shield layer 72 cooperates with another part, located over the thinner part 72b, of the lower insulating layer 74 with a generally uniform thickness, to constitute a thinner second portion of the lower film member, which defines a second area of surface (or the upper surface 74b of the lower insulating layer 74) on which the hard magnetic element layers 26 are laminated. Consequently, the second surface area (or the upper surface 74b) on which the hard magnetic element layers 26 are laminated is positioned at a lower level than the first surface area (or the upper surface 74a) on which the MR element layer 24 is laminated, in relation to the base 12, due to the difference between the respective thickness of the first and second portions of the lower film member, that is, the difference between the respective thickness of the thicker and thinner parts 72a, 72b of the lower shield layer 72.

The difference between the respective thickness of the first and second portions of the lower film member, or of the thicker and thinner parts 72a, 72b of the lower shield layer 72, substantially corresponds to the difference between the entire thickness of the MR element layer 24 and the total thickness of each hard magnetic element layer 26 plus each terminal layer 28. In this manner, the upper surface 24a of the MR element layer 24 and the upper surface 28a of each terminal layer 28 are located at a generally identical distance from the base 12, i.e., are placed in a substantially identical plane or level.

A method or process for producing the magnetic head 70 having the above structure is described below.

On the surface of the base 12 formed from a generally disk-shaped wafer, the base protection layer 18 and the reading-side lower shield layer (72) are laminated in this order and formed respectively with a uniform thickness in a range from several hundreds of Å to several μm. In this stage, the lower shield layer (72) is formed as a lower film blank having a generally uniform thickness as a whole. Then, a resist mask (not shown) is provided at a desired position in the upper surface of the lower film blank, and the certain portion of the lower film blank, which is positioned outside of the profile (defined at a later stage) of the MR element layer 24, is partially removed by, e.g., an etching process such as an ion milling process. In this manner, the reading-side lower shield layer 72 having the thicker and thinner parts 72a, 72b corresponding respectively to the first and second portions of the lower film member.

Then, the reading-side lower insulating layer 74 is laminated on the upper surface of the lower shield layer 72 and formed with a uniform thickness of several hundreds of Å, so as to form the first and second portions of the lower film member. Next, on the upper surfaces 74a, 74b of the lower insulating layer 74, the bias layer (44), the intermediate layer (46) and the magnetoresistive effect layer (48) are laminated in this order and formed respectively with a uniform thickness in a range from several tens of Å to several hundreds of Å, to form the MR element layer (24) with a triplex structure. In this stage, the MR element layer (24) is formed as an MR element blank having a generally uniform thickness as a whole.

Then, a resist mask (not shown) is provided at a position in the upper surface of the MR element blank, above or corresponding to the upper surface 74a of the lower insulating layer 74, and the MR element blank is thereafter trimmed into a predetermined profile through, e.g., an etching process such as an ion milling process, so as to pattern the MR element layer 24. After that, the pair of hard magnetic element layers 26 are formed on the upper surface 74b of the lower insulating layer 74, and the pair of terminal layers 28 are formed on the respective upper surfaces of the hard magnetic element layers 26, through a similar resist process and a similar etching process. When the etching process for forming the terminal layers 28 is finished, the upper surface 24a of the MR element layer 24 and the upper surface 28a of each terminal layer 28 are located in a substantially identical level, as illustrated.

On the substantially flattened surface including the upper surface 24a of the MR element layer 24 and the upper surface 28a of each terminal layer 28, the reading-side upper insulating layer 30, the reading-side upper shield layer (also serving as the recording-side lower pole) 32 and the recording gap layer 34 are laminated in this order and formed respectively with a uniform thickness in a range from several hundreds of Å to several μm. Then, the coil 36 (FIG. 2) and the recording-side insulating layer 38 (FIG. 2) are formed and laminated on the recording gap layer 34, and the recording-side upper pole 40 is formed and laminated with a uniform thickness of several μm on the recording gap layer 34 and the recording-side insulating layer 38. Further, the protective layer 42 is formed and laminated to cover the recording gap layer 34 and the recording-side upper pole 40. In this manner, the magnetic head 70 provided with the substantially flattened recording gap layer 34 is structured (FIG. 9).

In the magnetic head 70 having the above structure, it is necessary to additionally perform the step of partially removing the reading-side lower shield layer (72) for substantially flattening the recording gap layer 34 in the thin-film forming process of the magnetic head 70, and thereby the number of steps is increased. However, since no part of the reading-side lower insulating layer 74 is removed, it is possible to prevent the whole thickness of the lower insulating layer 74 from being increased, even if the step coverage function thereof for the lower shield layer 72 is considered. Also, it is possible to reduce the thickness of the reading-side upper insulating layer 30 to the minimum in a necessary range without considering the step coverage thereof, since the upper insulating layer 30 can be formed on the substantially flattened surface including the upper surface 24a of the MR element layer 24 and the upper surface 28a of each terminal layer 28. In this manner, it is possible to prevent the distance between the reading-side lower shield layer 72 and the reading-side upper shield layer 32 (that is, the reading gap dimension), between which the MR element layer 24 is located, from being increased, and thereby the recording gap layer 34 can be substantially flattened without affecting the reading signal characteristic of the magnetic head 70.

As is apparent from the above description, according to the present invention, it is possible to provide a magnetic head including an MR reading head section laminated on a base, and also provided with a substantially flattened recording gap layer in an inductive recording head section, which does not deteriorate a reading signal characteristic, and thus can perform an optimum magnetic recording/reading. It is also possible to provide a method for producing a magnetic disk, which can substantially flatten a recording gap layer in an inductive recording head without increasing the number of steps in a laminating process, and thus can prevent the production cost from being increased. It is further possible to provide a disk drive incorporating therein an improved magnetic head, which can perform a high performance magnetic recording/reading.

While the invention has been particularly shown and described with reference to preferred embodiments thereof, it will be understood by those skilled in the art that various changes and modifications may be made without departing from the spirit and scope of the following claims.

What is claimed is:

1. A magnetic head comprising:

a base;

a magnetoresistive head section formed on said base, said magnetoresistive head section including a magnetoresistive element layer arranged above said base and an operative layer including a terminal layer, said operative layer arranged above said base and laterally adjacent to said magnetoresistive element layer, a major surface of said magnetoresistive element layer being located in a level substantially identical to a major surface of said operative layer to form a generally even upper surface facing away from said base;

an inductive head section formed on said magnetoresistive head section, said inductive head section including a generally flat recording gap layer; and an upper film member arranged between said magnetoresistive element layer as well as said operative layer and said generally flat recording gap layer, said upper film member having a generally uniform thickness as a whole.

2. The magnetic head of claim 1, further comprising a lower film member arranged between said base and said magnetoresistive element layer as well as said operative layer, wherein a surface, facing away from said base, of said lower film member includes a first area being in contact with said magnetoresistive element layer and a second area being in contact with said operative layer, said second area being positioned at a lower level than said first area in relation to said base.

3. The magnetic head of claim 2, wherein said lower film member is formed from a first portion defining said first area and a second portion defining said second area, said second portion having a thickness less than that of said first portion.

4. The magnetic head of claim 2, wherein said lower film member includes a first lower layer arranged above said base and having a generally uniform thickness as a whole, and a second lower layer arranged above said first lower layer and having a locally varied thickness.

5. The magnetic head of claim 2, wherein said lower film member includes a first lower layer arranged above said base and having a locally varied thickness, and a second lower layer arranged above said first lower layer and having a generally uniform thickness as a whole.

6. The magnetic head of claim 1, wherein said operative layer further includes a hard magnetic element layer.

7. A disk drive comprising:

a magnetic head; and an actuator for shifting said magnetic head on a disk medium;

said magnetic head including:

a magnetoresistive head section formed on a base, said magnetoresistive head section being provided with a magnetoresistive element layer arranged above said base and an operative layer including a terminal layer, said operative layer arranged above said base and laterally adjacent to said magnetoresistive element layer, a major surface of said magnetoresistive element layer being located in a level substantially identical to a major surface of said operative layer to form a generally even upper surface facing away from said base;

an inductive head section formed on said magnetoresistive head section, said inductive head section being provided with a generally flat recording gap layer; and an upper film member arranged between said magnetoresistive element layer as well as said operative layer and said generally flat recording gap layer, said upper film member having a generally uniform thickness as a whole.

8. A magnetic head comprising:

a base;

a magnetoresistive head section formed on said base, said magnetoresistive head section including a magnetoresistive element layer arranged above said base and an operative layer including a terminal layer, said operative layer arranged above said base and laterally adjacent to said magnetoresistive element layer, a major surface of said magnetoresistive element layer being located in a level substantially identical to a major surface of said operative layer to form a generally even upper surface facing away from said base;

an inductive head section formed on said magnetoresistive head section, said inductive head section including a generally flat recording gap layer;

an upper film member arranged between said magnetoresistive element layer as well as said operative layer and said generally flat recording gap layer, said upper film member having a generally uniform thickness as a whole; and a lower film member arranged between said base and said magnetoresistive element layer as well as said operative layer, wherein a surface, facing away from said base, of said lower film member includes a first area being in contact with said magnetoresistive element layer and a second area being in contact with said operative layer, said second area being positioned at a lower level than said first area in relation to said base, wherein said lower film member includes a first lower layer arranged above said base and having a locally varied thickness, and a second lower layer arranged above said first lower layer and having a generally uniform thickness as a whole.

* * * * *